(12) United States Patent
Bowden

(10) Patent No.: US 10,656,235 B2
(45) Date of Patent: May 19, 2020

(54) SYSTEMS AND METHODS FOR DIRECTION FINDING BASED ON MINIMUM DISTANCE SEARCH TO PRINCIPAL COMPONENTS

(71) Applicant: Raytheon Company, Waltham, MA (US)

(72) Inventor: James M. Bowden, Forney, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/267,564

(22) Filed: Feb. 5, 2019

(65) Prior Publication Data

US 2019/0178973 A1    Jun. 13, 2019

Related U.S. Application Data

(62) Division of application No. 15/260,508, filed on Sep. 9, 2016, now Pat. No. 10,288,716.

(51) Int. Cl.
G01S 3/48 (2006.01)
G01S 3/46 (2006.01)

(52) U.S. Cl.
CPC .............. *G01S 3/48* (2013.01); *G01S 3/465* (2013.01)

(58) Field of Classification Search
CPC ... G01S 3/14; G01S 3/465; G01S 3/48; G01S 3/74; G01S 11/02
See application file for complete search history.

(56) References Cited

U.S. PATENT DOCUMENTS

| | | | |
|---|---|---|---|
| 5,355,141 A | 10/1994 | Graham et al. | |
| 5,495,256 A | 2/1996 | Piper | |
| 5,768,477 A | 6/1998 | Johnson et al. | |
| 5,892,700 A | 4/1999 | Haardt | |
| 6,127,974 A | 10/2000 | Kesler | |
| 6,377,213 B1 | 4/2002 | Odachi et al. | |
| 6,674,410 B1 | 1/2004 | Davidovitz | |
| 6,972,713 B2 | 12/2005 | Mosher et al. | |

(Continued)

OTHER PUBLICATIONS

International Preliminary Report on Patentability dated Mar. 21, 2019 for International Application No. PCT/US2017/024015; 10 Pages.

(Continued)

*Primary Examiner* — Dao L Phan
(74) *Attorney, Agent, or Firm* — Daly, Crowley, Mofford & Durkee LLP

(57) ABSTRACT

The concepts, systems and method described herein provide direction finding (DF) methods based on a minimum distance (MINDIST) search to principal components. In an embodiment, the method includes capturing samples of data from one or more array elements. The samples may be samples of a signal received at the array elements. The method includes generating a spatial sample covariance matrix (SCM) using the samples of data, extracting principal components from the SCM and generating a principal component table using angle and frequency measurement for each of the principal components. The method further includes determining a distance between a test point and each value in the principal component table and identifying a minimum distance point corresponding to a direction of the received signal. The minimum distance point may correspond to direction of arrival of a signal on the one or more array elements.

15 Claims, 5 Drawing Sheets

(56) References Cited

U.S. PATENT DOCUMENTS

| | | |
|---|---|---|
| 7,427,953 B2 | 9/2008 | Chiang et al. |
| 7,705,779 B2 | 4/2010 | Goldberg et al. |
| 9,329,265 B2 | 5/2016 | Murad et al. |
| 2007/0222672 A1 | 9/2007 | Hjelmstad et al. |
| 2010/0033377 A1 | 2/2010 | Straatveit |
| 2013/0120192 A1 | 5/2013 | Larson |
| 2013/0181861 A1 | 7/2013 | Zohar et al. |
| 2015/0070217 A1 | 3/2015 | Sharawi et al. |
| 2015/0234030 A1 | 8/2015 | Marr et al. |
| 2016/0003931 A1 | 1/2016 | Ledingham et al. |
| 2018/0074153 A1 | 3/2018 | Bowden |

OTHER PUBLICATIONS

Response to Rule 161(1) and 162 EPC Communication dated Apr. 16, 2019 for European Appl. No. EP17717569.2 as filed on Aug. 30, 2019; 12 pages.

Krim, et al.; "Two Decades of Array Signal Processing Research"; IEEE Signal Processing Magazine; pp. 67-94; Jul. 1996; 28 Pages.

U.S. Appl. No. 15/260,715, dated Sep. 9, 2016, Bowden.

Xu, et al.; "A Subarray-Synthesis Based 2D DOA Estimation Method"; Journal of Electronics (China); vol. 23; No. 5; pp. 645-649; Sep. 2006; 5 Pages.

PCT Search Report & Written Opinion of the ISA dated Jul. 5, 2017 from International Pat. App. No. PCT/US2017/024015; 17 Pages.

U.S. Restriction Requirement dated Jul. 26, 2018 for U.S. Appl. No. 15/260,715; 6 Pages.

Response to U.S. Restriction Requirement dated Jul. 26, 2018 for U.S. Appl. No. 15/260,715; Response filed Aug. 8, 2018; 1 Page.

U.S. Non-Final Office Action dated Nov. 1, 2018 for U.S. Appl. No. 15/260,715; 10 Pages.

Response to U.S. Non-Final Office Action dated Nov. 1, 2018 for U.S. Appl. No. 15/260,715; Response filed Nov. 28, 2018; 11 Pages.

U.S. Notice of Allowance dated Jan. 25, 2019 for U.S. Appl. No. 15/260,715; 9 Pages.

U.S. Non-Final Office Action dated Oct. 26, 2018 for U.S. Appl. No. 15/260,508; 9 Pages.

Response to U.S. Non-Final Office Action dated Oct. 26, 2018 for U.S. Appl. No. 15/260,508; Response filed Dec. 5, 2018; 7 Pages.

U.S. Notice of Allowance dated Jan. 25, 2019 for U.S. Appl. No. 15/260,508; 9 Pages.

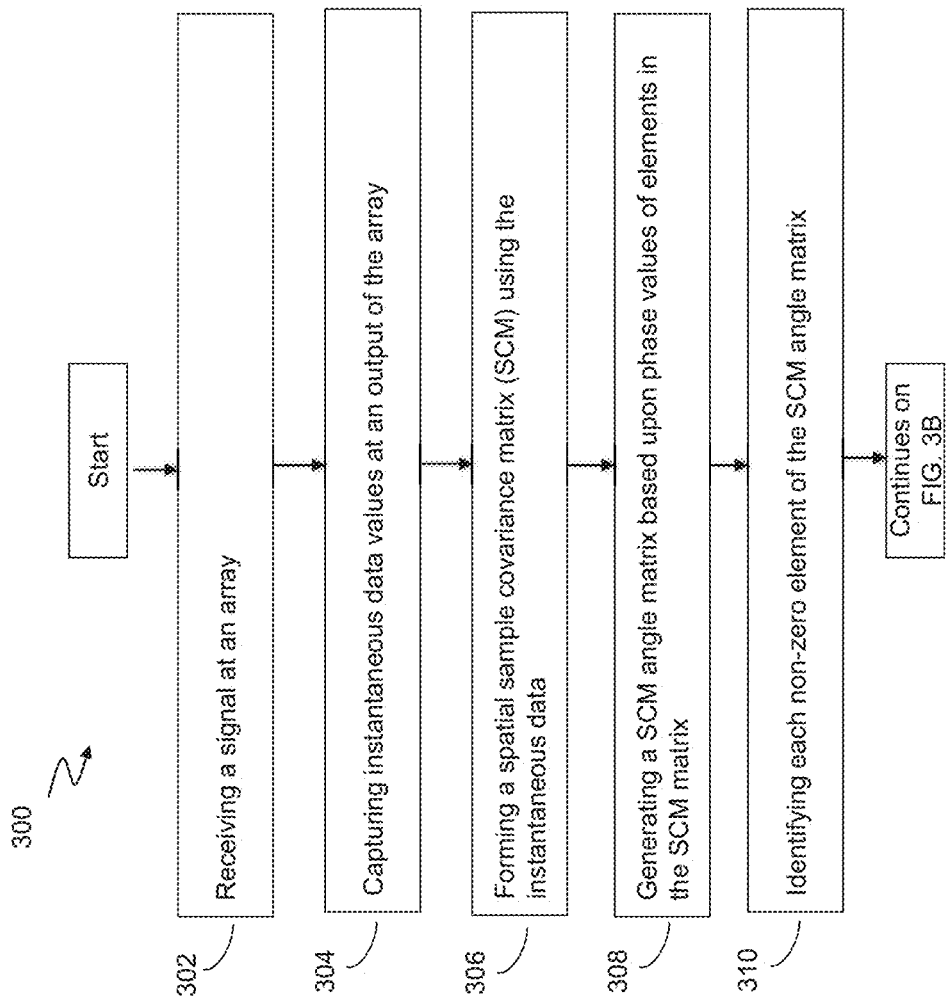

SYSTEMS AND METHODS FOR DIRECTION FINDING BASED ON MINIMUM DISTANCE SEARCH TO PRINCIPAL COMPONENTS

CROSS-REFERENCE TO RELATED APPLICATIONS

This application is a divisional application of U.S. patent application Ser. No. 15/260,508 filed on Sep. 9, 2016, which application is hereby incorporated herein by reference in its entirety.

GOVERNMENT INTERESTS

This invention was made with U.S. Government support. The U.S. Government has certain rights in this invention.

BACKGROUND

As is known in the art, direction finding (DF) may be described as a determination of a direction from which a received signal was transmitted. In order to make such a determination, current DF methods typically perform time-consuming calculations that are computationally expensive. For example, some DF methods include interferometry, multi-signal classification (MUSIC) and maximum likelihood estimation using direct complex measurements. However, each of these DF methods can be computationally expensive and time consuming.

SUMMARY

The concepts, systems and methods described herein provide direction finding (DF) techniques based on a minimum distance (MINDIST) search to principal components. The MINDIST technique provides accurate measurements of a direction of arrival of radio frequency (RF) plane waves incident on an antenna having arbitrarily located antenna phase centers in a computationally efficient manner. In an embodiment, the MINDIST technique compares elements (i.e., matrix elements) of a reduced dimension spatial sample covariance matrix (SCM) to principal component vectors for a given phase center location as a function of antenna beam angle and frequency. The principal component vectors may be stored in one or more tables and grouped or otherwise organized as a function of phase center location, antenna beam angle and/or frequency.

In an embodiment, a spatial SCM may be formed from measurements taken at instantaneous points in time (e.g., "snapshots") at a phase center of a plurality of array elements. An angle of each of the SCM elements may be determined based on phase differences between the plurality of array elements. The SCM elements having a non-zero angle (i.e., an angle that is greater than or less than zero) may be identified and a portion of such non-zero elements may be used to generate principal components for a principal component table (or p-table).

By eliminating components of the SCM having a value of zero and recognizing a symmetric nature of the SCM less than one-half of the SCM elements are required for computations. By extracting one-half of the SCM elements and using them in later computations, a total computation time of the MINDIST method may be reduced. For each of the principal components, vector data may be computed and stored (e.g., in tables). In some embodiments, the vector data may be precomputed. Thus, for each of a plurality of extracted principal components, the corresponding vector data may be identified and used to generate the p-table. The p-table thus has the principal components values stored therein. In some embodiments, the extracted principal component values may be sorted by frequency and angle data.

In operation, a test point can be compared to each of the entries in the p-table to identify a minimum distance point. The MINDIST method may use compare distance measurements to precomputed tables making the methods herein computationally feasible. The minimum distance point corresponds to a direction of arrival of the RF plane waves incident on the array elements. Thus, the MINDIST technique provides an estimation of an angle of arrival of RF signals. In some embodiments, the MINDIST method can be agnostic to phase center locations of the receivers.

In one aspect, a method is provided for direction finding. The method includes receiving a signal at one or more elements of an array and capturing samples of the data at respective outputs of each array element at one or more angles and/or frequencies. In an embodiment, each sample may be taken at a phase center of a respective array element. The method further includes generating a spatial SCM using the one or more samples of data, extracting principal components from the SCM, generating a principal component table using angle and frequency measurement for each of the principal components, determining a distance between a test point and each value in the principal component table and identifying a minimum distance point corresponding to a direction of the received data.

A phase center may be determined for each of the one or more array elements. In some embodiments, each sample may correspond to a snapshot of a received signal over a predetermined period of time. The test point may be determined based on the snapshot of the received signal over the predetermined period of time.

In an embodiment, the method may include determining frequency, amplitude and phase properties of the received data from the one or more array elements. Each of the samples of data may include an angle measurement corresponding to the received data relative to the phase center of one of the one or more array elements.

The method may include identifying a phase difference between each of the array elements in the SCM using the angle measurement and identifying phase difference measurements from the SCM that are greater than zero or less than zero. In an embodiment, the phase difference measurements may be extracted from the SCM that are greater than zero or less than zero.

In some embodiments, the method may include determining vector data for each of the one or more array elements, wherein the vector data includes an angle and a frequency measurement. The method may include determining a product of the vector data from each of the one or more array elements and a complex conjugate for the vector data from each of the one or more array elements.

In some embodiments, the principal component table may include principal component data sorted by frequency measurements and angle measurements for each of the principal components.

In an embodiment, a Mahalanbois distance method or a standardized Euclidean distance method may be used to calculate the distance from the test point to each entry in the principal components table while taking into account the statistical variance of data points in the p-table. An inverse covariance matrix may be applied at the time of measurement when computing distance to each entry in the principal component table.

In another aspect, a system for direction finding is provided. The system includes one or more elements in an array to receive signals, one or more receivers coupled to the one or more array elements, wherein the one or more receivers capture one or more samples of data corresponding to the signals received at a phase center of the one or more array elements, and a direction finding module.

The direction finding module may include a spatial SCM module to receive samples of data and generate an SCM using the one or more samples of data, a p-table module to generate a table having components as a function of frequency and angle measurements and a principal component module coupled to the SCM module and the p-table module. The principal component module may generate a principal component table having one or more principal components sorted by the frequency and angle measurements. The direction finding module may further include a distance measurement module coupled to the principal component module, wherein the distance measurement module calculates a distance from a test point to each entry in the principal component table and a minimum distance module coupled to the distance measurement module, wherein the minimum distance measurement module determines a minimum distance point based on the calculated distances from the test point to each entry in the principal component table.

In some embodiments, the principal component module may extract principal component from the SCM. The principal component module may determine vector data for each of the one or more array elements. The vector data may correspond to the frequency and angle measurement. In an embodiment, the principal component table may include principal component data sorted by the frequency and angle measurements for each of the principal components. The minimum distance module may compare each of the calculated distances determined for each entry in the principal component to each other.

BRIEF DESCRIPTION OF THE DRAWINGS

The foregoing concepts and features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the concepts, systems and techniques described herein. Like numbers in the figures denote like elements.

FIGS. 3A and 3B are a flow diagram of a method for performing direction finding using the MINDIST method.

DETAILED DESCRIPTION

Figure 1:
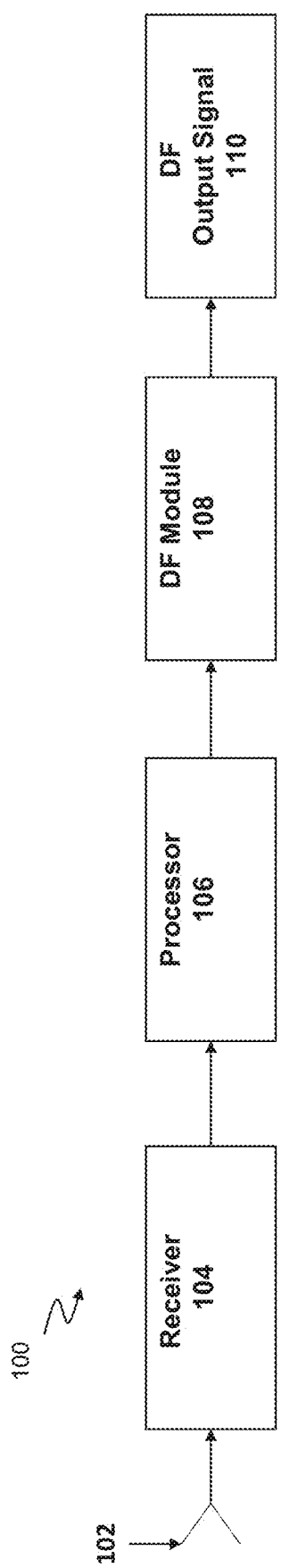
FIG. 1 is a block diagram of a minimum distance (MINDIST) direction finding (DF) system.

Now referring to FIG. 1, a minimum distance (MINDIST) direction finding (DF) system 100 includes an array antenna 102 comprised of a plurality of array elements, a receiver 104, a processor 106 and a DF module 108. In response to a radio frequency (RF) signal incident on array 102, an output of the array 102 may be coupled to an input of the receiver 104 which may amplify and/or down convert and/or demodulate the signal as is generally known. An output of the receiver 104 may be coupled to an input of the processor 106. An output of the processor 106 may be coupled to an input of the DF module 108 which processes the signals using techniques described herein below to produce a DF output signal 110 at an output thereof.

In some embodiments, the array 102 may be integrated with the receiver 104. In an embodiment, array 102 may have a plurality of active elements (e.g., radiating antenna elements) or groups of active elements. In other embodiments, array 102 may have a plurality of passive elements or groups of passive elements. In still other embodiment, array 102 may have a combination of active and passive elements or groups of elements having a combination of active and passive elements. In some embodiments, array 102 may be comprised of a plurality of individual elements or may be comprised of a plurality of sub-arrays with some or all of the sub-arrays being comprised of a plurality of individual antenna elements. Array 102 performs at least a receive function but may also provide a transmit function.

In some embodiments, the receiver 104 may be a receiver portion of a radar or other RF system. The receiver 104 provides the appropriately processed signal to processor 106. In some embodiments, processor 106 may analyze the signal to determine various properties of the signal, including but not limited to frequency, angle, and/or phase data. The processor 106 provides the processed signal information (hereinafter data) to the DF module 108.

The DF module 108 receives the data provided by the processor 106 and analyzes the data to determine signal properties and produce the DF output signal 110. In some embodiments, the DF output signal 110 may represent (either directly or indirectly) a direction of arrival of a signal received by array 102. The DF module 108 and DF output signal 110 will be described in greater detail below in conjunction with FIG. 2.

In the illustrative embodiment of FIG. 1, a single array 102, receiver 104, processor 106 and DF module 108 is shown. However, it should be appreciated that array 102 may be provided having any number of array elements. Also, as noted above array 102 may be provided from a plurality of sub-arrays. It should also be appreciated that the DF system 100 may have a plurality of arrays. Likewise, the DF system 100 may have a plurality of receivers 104, processors 106 and/or DF modules 108. Thus, it should be appreciated that antennas or arrays 102, receivers 104, processors 106 and/or DF modules 108, in any combination, may be used in the MINDIST DF system 100.

Also, the RF signals received by the DF system 100 may correspond, for example, to any one of a variety of different types of signals including but not limited to a ground or airborne radar signal, an emergency beacon signal, a ground-based or airborne-based search and rescue signal. Thus, the MINDIST DF system 100 may be used to locate ground or airborne-based radar systems or to detect and locate the source of an emergency beacon signal.

Figure 2:
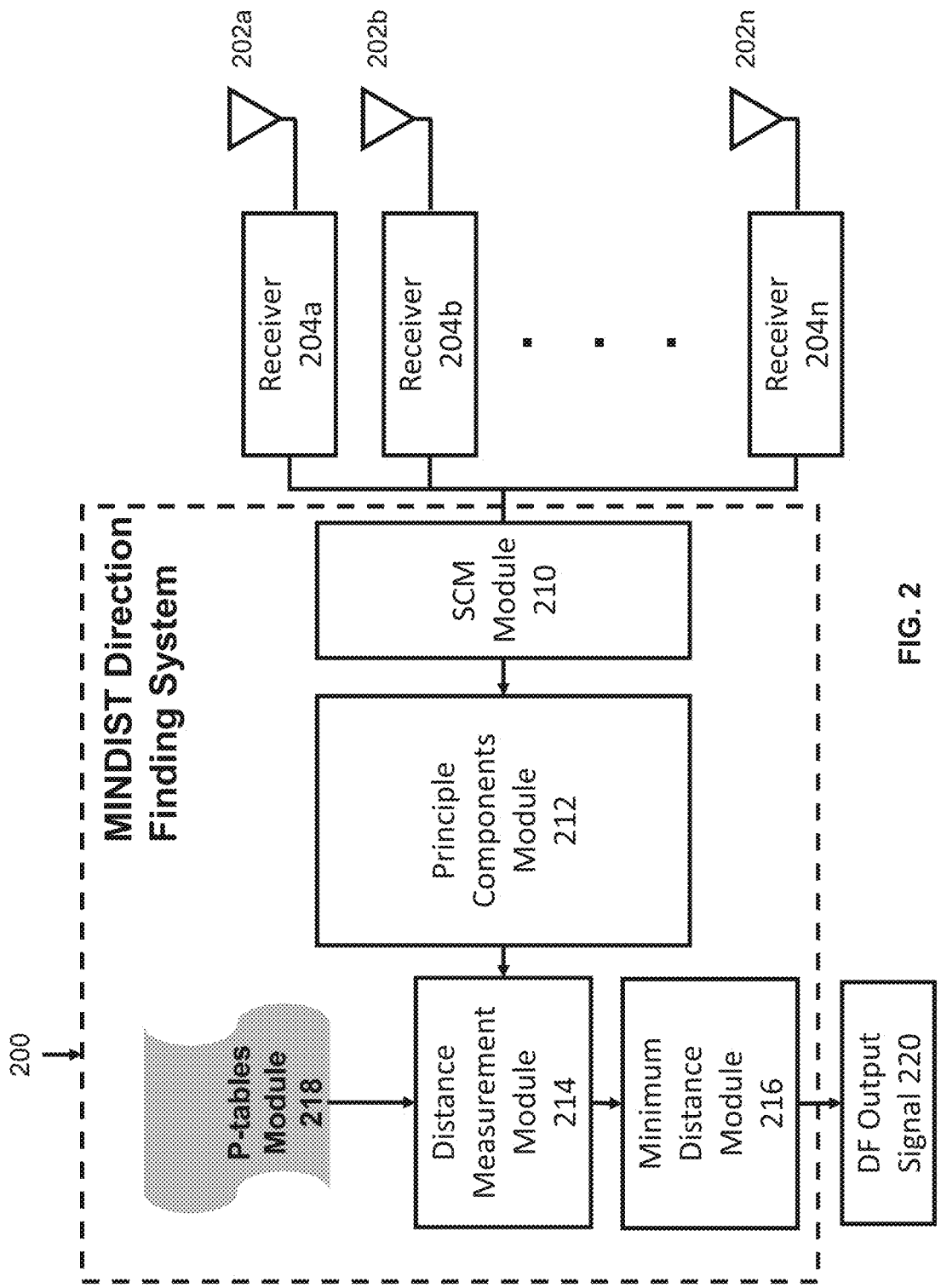
FIG. 2 is a block diagram of a MINDIST DF module.

Now referring to FIG. 2, a MINDIST DF module 200 may be coupled to a plurality of array elements 202a-202n through a plurality of receivers 204a-204n (or through a single multi-channel receiver). As noted above, each array element 202a-202n may represent a single antenna element which together form an array antenna. Of alternatively, each array element 202a-202n may represent a sub-array with the multiple sub-arrays together forming an array antenna. Other array antenna implementations may also be possible.

Regardless of the manner in which the array antenna is implemented, as shown in the illustrative embodiment of FIG. 2, an output of each of the plurality of array elements 202a-202n may be coupled to an input of at least one of the plurality of receivers 204a-204n. In some embodiments, two or more outputs of the plurality of array elements 202a-202n may be coupled to an input of at least one of the plurality of receivers 204a-204n.

An output of each of the plurality of receivers 204a-204n may be coupled to the DF module 200. In an embodiment, the plurality of array elements 202a-202n and/or the plurality of receivers 204a-204n may be coupled (e.g., directly, communicatively) to the DF system 200. In other embodiments, the plurality of array elements 202a-202n and/or the plurality of receivers 204a-204n may be integrated within the DF system 200.

The plurality of array elements 202a-202n may receive one or more signals and provide them to the plurality of receivers 204a-204n. In some embodiments, the receivers 204a-204n may be digital receivers. The receivers 204a-204n may perform various processing on the signals. For example, the receivers 204a-204n may amplify and/or demodulate the signals. In some embodiments, the receivers 204a-204n may take or record samples of each of the signals at specific points in time (i.e., "a snapshot"). The samples may be taken at or relative to a phase center of respective ones of array elements 202a-202n.

The samples may include complex data (e.g., I/Q data) representing the signal. For example, in some embodiments, the samples may include complex voltage signals represented as angle, amplitude, phase, and/or a polarization of the signal, for example. In an embodiment, each of the samples may correspond to a value of the signal at a predetermined point in time (i.e. a snapshot) or over a predetermined time period. The samples of data corresponding to the plurality of signals may be coupled or otherwise provided to an input of the DF module 200.

In an embodiment, the DF module 200 includes a spatial sample covariance matrix (SCM) module 210, a principal components module 212, a distance measurement module 214, a minimum distance module 216 and a p-table module 218.

In an embodiment, the SCM module 210 receives the samples of data and generates a matrix of values (i.e., an SCM) using the samples of data. Values stored in the SCM from a first snapshot may be compared to the samples from each of the plurality of array elements 202a-202n. For example, the SCM may compare samples from first and second array elements in the plurality of array elements 202a-202n. The results of such a comparison may represent an entry in the SCM and thus be referred to herein as an SCM entry.

The SCM module 210 may generate a second SCM (referred to herein below as an "angle SCM") that identifies an angle of each of the SCM entries. In an embodiment, a value stored as an entry in the angle SCM may be equal to a phase difference between signals received at the array elements being compared. For example, a phase difference between first and second array elements may correspond to an angle of the SCM entry comparing the first and second array elements. The SCM module 210 may provide one or more SCMs to an input of the principal components module 212. In some embodiments, the SCM module 210 may only provide a portion of the SCM entries (e.g., so-called principal components as will be explained in detail further below) in the SCM to the principal components module 212.

The principal components module 212 may extract so-called principal components from the generated SCMs. In an embodiment, the principal components may correspond to the SCM entries having a non-zero angle. A non-zero angle refers to an angle that is greater than or less than 0 (thus not equal to zero). For example, the SCM may include SCM entries that compare samples taken at array elements to themselves (e.g., $\Delta\Phi xx=0$). Thus, the respective angle for these entries may equal zero. In some embodiments, the SCM entries having an angle equal to zero may be removed from further processing or ignored. Thus, SCM entries having a non-zero angle may be extracted from the SCM.

In some embodiments, the principal components module 212 may extract only a portion of the non-zero SCM entries. For example, the SCM may include SCM entries that compare the two different array elements (i.e. array element M and array element N) to generate a first SCM entry $\Delta\Phi mn$ and a second SCM entry $\Delta\Phi nm$. In this case, it has been recognized that the first SCM entry will be equal in amplitude to the second SCM entry (e.g., $\Delta\Phi mn=\Delta\Phi mm$). Thus, only one of the first and second SCM entry may be needed for processing.

In one embodiment, the principal components module 212 extracts one-half of the SCM entries having a non-zero angle. The principal components module 212 may generate a non-zero SCM entry table comprising the extracted SCM entries having a non-zero angle.

The p-table module 218 may generate one or more tables having stored therein principle component values (p-table values). The p-table values may be stored and indexed for example, as a function of angle and frequency. In an embodiment, the angle corresponds to an angle of arrival of a received signal incident on one or more of the plurality of array elements 202a-202n. In some embodiments, the angles may be sorted two-dimensional angles (e.g., azimuth angle, elevation angle).

In an embodiment, p-table may be provided as a precomputed table (e.g., a table having precomputed values stored therein) or a principal component table (e.g., a table having principal components based on measured data). The pre-computed p-table may be generated using the same methods as described above, however, the pre-computed p-table may be generated using previous data measurements and/or estimates. For example, the p-table may be precomputed using previously collected snapshots at one or more of the plurality of array elements 202a-202n. The data from the previous snapshots may be used to generate a first SCM and a second SCM (e.g., angle SCM). Using the angle SCM, principal components may be identified and extracted from the SCM. Thus, the precomputed p-table may be generated using the extracted principal components based on the data from the previous snapshots.

In other embodiment, the p-table may be precomputed using estimated array properties (e.g., array manifold vector properties). For example, estimated array properties may be used to generate estimated snapshots for one or more of the plurality of array elements 202a-202n. The pre-computed p-table may be generated using the methods as described above based on the estimated snapshots for the array elements 202a-202n.

In an embodiment, the frequency and angle components may be precomputed based upon estimations or previously collected data. For example, in some embodiments, the frequency and angle components may be pre-computed using previously collected snapshots. In other embodiments, the frequency and angle components may be precomputed using estimates performed based on known phase centers for one or more of the plurality of array 202a-202n. In some embodiments, using estimated or measured phase center locations, the frequency and angle components may be precomputed using an array manifold vector corresponding to the plurality of array elements 202a-202n.

For example, for a desired range, the p-table module 218 may perform a statistical analysis for measuring the amount of power or information contained in the data stored in the p-table. Such an analysis may be performed for all angles within a desired range relative to a predetermined azimuth range and a predetermined elevation range. In an embodiment, a principal component analysis may be used to measure the amount of power and/or information contained in multivariate data, here the desired range relative to the predetermined azimuth range and the predetermined elevation range. For example, the principal component analysis may be performed for each of the array elements over a desired frequency range using an array manifold vector corresponding to the plurality of array elements 202a-202n. Thus, the p-table module 218 may generate vector data (e.g., principal component data) for each of the plurality of array elements 202a-202n. In some embodiments, the vector data may be generated (estimated) based on the phase center locations of the plurality of array elements 202a-202n.

In some embodiments, the p-table module 218 multiplies the resulting vector data for each array element by its complex conjugate and/or the complex conjugate of vector data from another array element and stores the result in a vector data table.

In an embodiment, the p-table module 218 compares the vector data table to an SCM phase difference matrix to identify the vector data corresponding to the angle SCM entries having a non-zero angle and extract the corresponding vector data. The p-table module 218 generates a final p-table that sorts each of the SCM entries having a non-zero angle by their respective vector data (e.g., by frequency and angle data). In an embodiment, the final p-table may be a principal component table. Thus, the final p-table may include the extracted principal component data sorted or otherwise grouped or arranged by frequency and angle.

In some embodiments, the p-table module 218 may generate one or more p-tables prior to the DF module 200 receiving signals or data from the plurality of receivers 204a-20n. In other embodiments, the p-table module 218 may generate one or more p-tables simultaneously (e.g., real-time) to the DF module 200 receiving signals or data from the plurality of receivers 204a-20n.

In some embodiments, the number of p-tables generated may vary and/or the size or number of elements in a p-table may vary according to a particular application of the MINDIST method. For example, in some embodiments, the p-table may be generated for a desired angular field of view (e.g., ±M° az, ±N° el). Thus, the number of elements in the p-table is related at least to the desired angular field of view.

The distance measurement module 214 receives the principal component values from the principal components module 212 and from a p-table provided by the p-table module 218. The distance measurement module 214 calculates a distance between a test point and each of the entries in the p-table. In an embodiment, the test point may refer to a data point measured in real time. Thus, a distance between the test point (or real time data point) to each entry in the p-table may be determined to identify a minimum value (e.g., closest entry) in the p-table to the test point that was collected. In some embodiments, multiple test points may be used. For example, a distance may be determined for each of a plurality of test points, from the respective test point to each entry in the p-table. The distance is the metric we are trying to optimize.

In some embodiments, the distance measurement module 214 may select a distance metric to perform the calculation. For example, and without limitation, the distance measurement module 214 may use a Mahalanbois distance or a standardized Euclidean distance to perform the calculation. In some embodiments, the Mahalanbois distance or the standardized Euclidean distance may be used to calculate the distance between each entry in the non-zero SCM (e.g., test points) and a corresponding entry in the p-table. The calculation is described below in greater detail with respect to FIGS. 3A-3B. In an embodiment in which the Euclidean distance is used, an inverse covariance matrix may be precomputed and applied to the p-table entries in order to reduce a computation time of the MINDIST method.

The minimum distance module 216 may receive the calculated distances from the distance measurement module 214. In an embodiment, the minimum distance module 216 may identify a value from the calculated distances between the test point (or multiple test points) and each entry in the p-table that is a minimum distance as compared with the other calculated distance values. The value may be a minimum distance point representative of an angle of arrival of a signal on the plurality of array elements 202a-202n.

In an embodiment, the minimum distance module 216 may output a signal indicating the minimum distance point, such as a DF output signal 220. The minimum distance may indicate the minimum value (e.g., closest entry) in the p-table to the test point that was collected. In some embodiments, the minimum distance point may correspond to the estimated angle of arrival of the signal incident on one or more of the array elements 202a-202n. Thus, the DF module 200 may produce a DF output signal 220 representative of an estimated angle of arrival of a signal incident on one or more of the array elements 202a-202n.

In an embodiment, DF module may be the same as or substantially similar to DF module 108 described above with respect to FIG. 1.

Figure 3B:
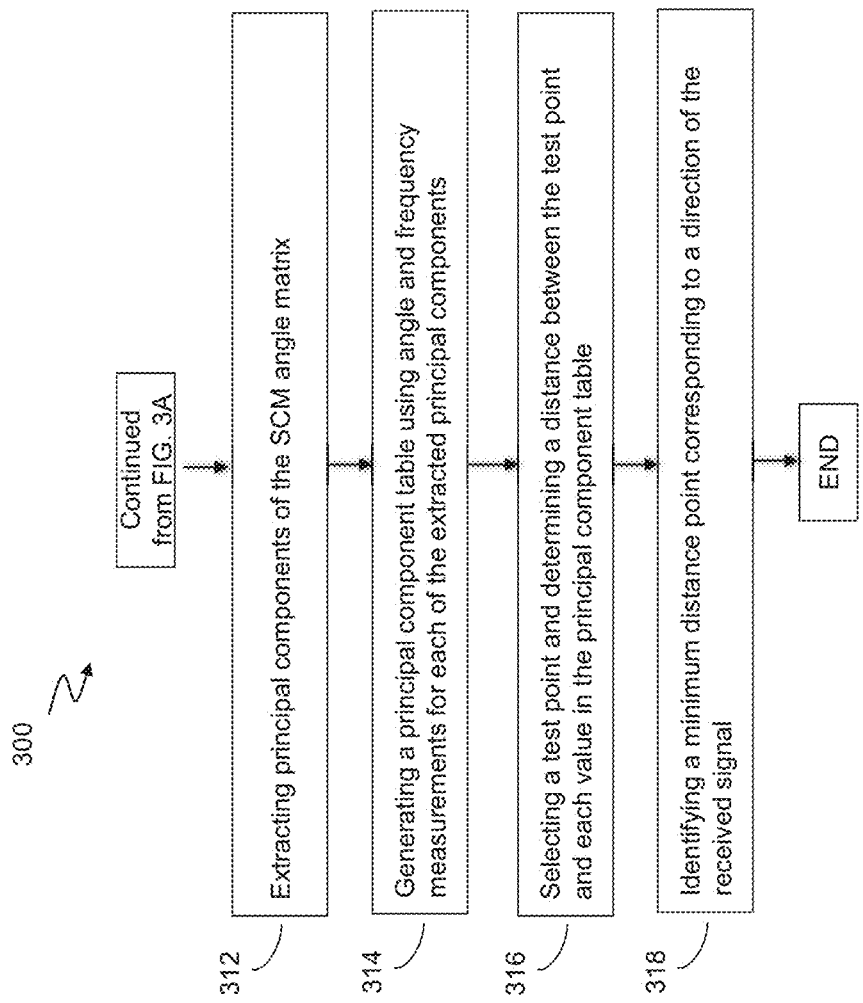

Now referring to FIGS. 3A and 3B, an illustrative method 300 for performing direction finding using a minimum distance (MINDIST) technique begins in processing block 302, where one or more elements of an array receive RF signals and provide RF output signals at outputs thereof. For example, the RF signals may be received at array 102 of FIG. 1 or array elements 202a-202n of FIG. 2. The RF signals may be received from one or a variety of different RF sources. For example, and as noted above, in some embodiments, the RF signals may correspond to a type of emergency beacon signal used in a variety of different applications, including but not limited to, airborne or ground-based search and rescue applications.

In some embodiments, a phase center for each of the one or more array elements may be determined. In one embodiment, the phase center may refer to locations of array elements (or location of an array element) that are coupled to and/or feed into a receiver portion. The phase centers may be estimated or measured. For example, in some embodiments, the phase center (or apparent phase center) for each of the array elements can be predetermined based on the properties of the respective array element and/or the properties of an array antenna. The properties may include, but not limited to, the dimensions of the array element and/or the array antenna, a radiation pattern of the array element and/or array antenna. In some embodiments, the phase center can be based, at least in part, on the techniques used to couple respective array elements to a receiver portion and/or positioning of an element within the array antenna. In some embodiments, the phase centers may be determined when the signal is received at the respective array element. In some embodiments, phase centers may be determined prior to the signals being received at the one or more array elements in order to generate a precomputed p-table, as will be discussed in greater detail below.

In an embodiment, the MINDIST technique may be indifferent to phase center locations of the one or more array elements. For example, the MINDIST technique may not restrict a phase center to be in a specific location for one or more of the array elements. Thus, the relationship of the phase center locations between the one or more array elements may be ignored in the MINDIST technique.

At block 304, samples of instantaneous data values at an output of the array may be captured. For example, the received data values may be captured (e.g. via receiver 104 shown in FIG. 1 or receivers 204a-204n shown in FIG. 2) at respective outputs of each array element at one or more angles and/or frequencies. In an embodiment, the angle may correspond to an angle of arrival of the received RF signal. The samples of data from a received signal may be captured at an instantaneous point in time (i.e. a snapshot) or over a predetermined time period.

The data samples may include complex data (e.g., I/Q data) representing the signal. For example, in some embodiments, the samples may include complex voltage signals representative of an angle of arrival, amplitude, phase, and/or a polarization of the received signal.

In some embodiments, multiple samples may be taken of a single signal. In other embodiments, multiple samples may be taken of a plurality of different signals. In one embodiment, each of the samples may correspond to different signals. It should be appreciated, that the number of data samples taken may vary depending upon a particular application to which the MINDIST technique is applied. For example, in some embodiments, the number of samples taken may be based, at least in part, on a signal-to-noise ratio of the received RF signal. In one embodiment, RF signals having a low signal-to-noise ratio may need more samples to increase an accuracy of the MINDIST technique.

At block 306, a spatial SCM is formed using the samples of data (e.g., snapshots). In an embodiment, the spatial SCM may be formed by the DF module 108 of FIG. 1 or the DF module 200 of FIG. 2. For example, in one embodiment, the spatial SCM may be formed by the SCM module 210 of DF module 200. The SCM may include each of the samples taken at the antenna phase centers and compare them to each other. For example, a sample SCM is provided below:

TABLE 1

$$Sxx = \begin{bmatrix} S11 & S12 & S13 & \ldots & S1N \\ S21 & S22 & S23 & \ldots & S2N \\ S31 & S32 & S33 & \ldots & S3N \\ \vdots & \vdots & \vdots & \ddots & \vdots \\ SN1 & SN2 & SN3 & \ldots & SNN \end{bmatrix}$$

Where Sxy represents a comparison of a sample taken at array element x to a sample taken at array element y. In an embodiment, $S_1$, $S_2$, etc. are complex values (e.g., an amplitude and phase which may be represented as $A_1 \angle \theta_1$). In the SCM above, values in a first column of the SCM represent a difference between a sample of data taken at a first array element to the samples taken at each of the other array elements. Values along the main diagonal of the SCM represent the difference between two samples taken at the same array element. Hence, the values of the main diagonal are ideally equal to zero. An $N^{th}$ column of the SCM has values corresponding to the difference between a sample of data taken at an $N^{th}$ array element to the samples taken at each of the other array elements. Thus, it should be appreciated that the SCM may typically include any number of rows and/or columns corresponding to the number of rows and/or columns in the array. In some embodiments, the number of rows and/or columns in the SCM may be based at least on the number of array elements. It should be appreciated that the MINDIST technique may include both linear (e.g., one-dimensional) and planar arrays (two-dimensional).

At block 308, a SCM angle matrix may be generated based upon phase values of elements in the SCM matrix. In an embodiment, the SCM angle matrix may be generated by the DF module 108 of FIG. 1 or the DF module 200 of FIG. 2. For example, in one embodiment, the SCM angle matrix may be formed by the SCM module 210 of DF module 200.

In an embodiment, the SCM includes angle measurements for each of the one or more array elements. The angle measurements may be used to determine or otherwise identify a phase difference between each of the entries in the SCM. In an embodiment, each of the entries in the SCM may be referred to as an SCM entry or SCM element. The value of each SCM entry represents a comparison of the samples taken at the phase centers of each of the array elements. In some embodiments, an angle of the SCM entries represents a phase difference between the array elements represented by the respective SCM entry. For example, an SCM entry corresponding to a sample comparison between a first and second array element has an angle corresponding to the phase difference between the first and second array element. In some embodiments, a second SCM may be generated that contains the phase difference between one or more array elements. For example, one embodiment of a SCM angle matrix is provided below:

TABLE 2

$$\angle Sxy = \begin{bmatrix} 0 & -\Delta\Phi 12 & -\Delta\Phi 13 & \ldots & -\Delta\Phi 1N \\ \Delta\Phi 21 & 0 & -\Delta\Phi 23 & \ldots & -\Delta\Phi 2N \\ \Delta\Phi 31 & \Delta\Phi 31 & 0 & \ldots & -\Delta\Phi 3N \\ \vdots & \vdots & \vdots & \ddots & \vdots \\ \Delta\Phi N1 & \Delta\Phi N2 & \Delta\Phi N3 & \ldots & 0 \end{bmatrix}$$

Where $\angle Sxx$ represents an angle defined by the comparison of a phase measurement at array element x to a phase measurement at array element y. Thus, $\Delta\Phi 21$, corresponds to a phase difference between a first and a second element.

At block 310, each non-zero element of the SCM angle matrix may be identified. In an embodiment, each non-zero element of the SCM angle matrix may be identified by the DF module 108 of FIG. 1 or the DF module 200 of FIG. 2. For example, in one embodiment, each non-zero element of the SCM angle matrix may be identified by the SCM module 210 of DF module 200.

Referring to table 2 above, it should be noted that zero values along the main matrix diagonal correspond to a phase difference taken between the phase of a single array element. For example, the SCM entry, $S_{11}$, would have no phase difference, as the phase difference between the first array element and the first array element would be zero. In some embodiments, the SCM of table 2 may be referred to as a SCM angle matrix.

It should also be noted that the angle measurement between a first and second array element may be included twice in the table (e.g., in the first column, ΔΦ21, and in the second column, −ΔΦ12). That is, while the SCM compares the phase difference between different elements, however there may be some redundancy in some of the phase difference comparisons, (e.g., ΔΦmn=−ΔΦnm). As ΔΦmn=−ΔΦnm, only one of these values may be needed for computations. Therefore, in some embodiments, only a portion of the non-zero SCM entries need be extracted from the SCM. Thus, a reduction in the number of array elements to be analyzed can be realized to reduce an overall computation time of the MINDIST technique by extracting only a portion of the non-zero SCM entries from the SCM phase different matrix.

At block 312, principal components may be extracted from the SCM angle matrix. In an embodiment, the principal components may be extracted by the DF module 108 of FIG. 1 or the DF module 200 of FIG. 2. For example, in one embodiment, the principal components may be extracted by the principal components module 212 of DF module 200.

In an embodiment, the principal components may correspond to SCM entries having a non-zero angle. For example, and referring back to table 2, phase difference measurements that are greater than or less than zero (i.e., not equal to zero) may be identified in the SCM. The phase difference measurements that are greater than or less than zero may be extracted from the SCM and represent principal components.

In one embodiment, one-half of the non-zero entries may be extracted from the SCM. In other embodiments, the number of principal components extracted may vary depending upon a variety of factors including, but not limited to a frequency of the signal(s) being analyzed. For example, in one embodiment, as the frequency increases, the variance (e.g., power) may be distributed across the principal components. In some embodiments, a signal having a frequency can have a smaller wavelength and therefore more information may be contained in more of the antenna phase centers. Alternatively, in other embodiments, a signal having a lower frequency may have a longer wavelengths and fewer phase centers may be needed to perform the MINDIST technique. Thus, more principal components may be needed to compute a minimum distance point at a higher frequency than at a lower frequency.

At block 314, a principal component table (p-table) is generated by extracting desired values from the SCM angle matrix as described above and indexed using angle and frequency measurements for each of the extracted principal components. In an embodiment, the p-table may be generated by the DF module 108 of FIG. 1 or the DF module 200 of FIG. 2. For example, in one embodiment, the p-table may be generated by the p-tables module 218 of DF module 200.

In an embodiment, each of the extracted principal components may have corresponding angle and frequency measurements that have been pre-computed. The angle and frequency measurements can be included in the p-table with the corresponding extracted principal component. Thus, the principal components may be sorted in the p-table by their respective frequency, angle and/or phase components.

In some embodiments, the frequency and angle components of the p-table may be precomputed in tables and can be extracted to the p-table. For example, the frequency and angle components can be pre-computed based on previously collected data and/or using estimated data. In an embodiment, the estimated data may be based on a known phase center location for a respective array element or data measured in a lab setting using, for example, a computer model of the array element (or array antenna). In some embodiments, the frequency and angle components may be computed prior to the one or more array elements receiving a signal or prior to a sample of data being taken at each array element. Thus, the frequency and angle components may be extracted from the precomputed tables during execution of the MINDIST technique. In an embodiment, the tables may be look-up tables (or indexes) and the corresponding vector data may be extracted after the principal components have been identified.

In other embodiments, the frequency and angle components may be computed simultaneously or substantially simultaneously as the one or more array elements receiving signals or samples of data being taken at one or more of the array elements.

In an embodiment, the frequency and angle components may be computed for a desired range. For example, a table may be generated by performing a principal components analysis for all angles within a desired range relative to predetermined azimuth range and a predetermined elevation range. For example, and referring to equation 1 below:

$$\forall (\theta, \varphi) \in \left[-\frac{\pi}{2}, \frac{\pi}{2}\right] \times \left[-\frac{\pi}{2}, \frac{\pi}{2}\right] \qquad \text{Eq. 1}$$

As illustrated in Eq. 1, using a range defined by the azimuth range of $$\left[-\frac{\pi}{2}, \frac{\pi}{2}\right]$$

and the elevation range of $$\left[-\frac{\pi}{2}, \frac{\pi}{2}\right],$$

frequency and angle components may be computed using an array manifold vector. In an embodiment, the array manifold vector corresponds to the array of array elements being analyzed. Thus, the array manifold vector $\bar{v}(f, \theta, \varphi)$, may be represented by equation 2 below:

$$\bar{v}(f, \theta, \varphi) = \left[ e^{j\frac{2\pi f}{c_{light}} P_{el1}^T \bar{u}(\theta,\varphi)}, e^{j\frac{2\pi f}{c_{light}} P_{el2}^T \bar{u}(\theta,\varphi)} \ldots e^{j\frac{2\pi f}{c_{light}} P_{elk}^T \bar{u}(\theta,\varphi)} \right]^T \qquad \text{Eq. 2}$$

in which:

$c_{light}$ = speed of light $P$ = Element position $T$ = vector Transpose operator $el_i$ = the element index $\bar{u}$ = normalized line of sight direction vector as a function of $(\theta, \phi)$ $\theta$ = azimuth angle $\varphi$ = elevation angle The frequency and angle components may be computed for each of the array elements over a desired frequency range using the array manifold vector. In an embodiment, vector data may be generated for each of the array elements. In an embodiment, the vector data may be generated by the DF module 108 of FIG. 1 or the DF module 200 of FIG. 2. For example, in one embodiment, the vector data may be generated by the p-tables module 218 of DF module 200.

In an embodiment, a vector data table may be generated by comparing the vector data from each of the array elements. For example, one embodiment of a vector data table is illustrated below:

TABLE 3

$$Svv = \begin{bmatrix} v_1v_1^* & v_1v_2^* & v_1v_3^* & \dots & v_1v_N^* \\ v_2v_1^* & v_2v_2^* & v_2v_3^* & \dots & v_2v_N^* \\ v_3v_1^* & v_3v_2^* & v_3v_3^* & \dots & v_3v_N^* \\ \vdots & \vdots & \vdots & \ddots & \vdots \\ v_Nv_1^* & v_Nv_2^* & v_Nv_3^* & \dots & v_Nv_N^* \end{bmatrix}$$

Where $v_x$ represents the vector data for array element x and $v_x^*$ represents the complex conjugate of the vector data for array element x (i.e., $v_2v_1^* = \Delta\Phi_{21}(f, \theta, \varphi)$). In an embodiment, to generate the vector data table, the resulting vector data for each array element may be multiplied by its complex conjugate and/or the complex conjugate of vector data from another array element.

In some embodiments, the vector data table can be precomputed and thus used as a look-up table to pull specific entries corresponding to an extracted principal component. In an embodiment, the SCM angle matrix (table 2) may be used to identify the appropriate entries in the vector data table (table 3) to be extracted. For example, the non-zero elements in the SCM angle matrix correspond to the extracted principal components and in some embodiments, the entries in the vector table data corresponding to the extracted principal components may be extracted to generate a p-table. Thus, the number of entries in the p-table may correspond to the number of extracted principal components (e.g., 1 entry per each extracted principal component) and the extracted entries from the vector data table.

The p-table may sort each of the SCM elements having a non-zero angle by their respective vector data (e.g., by frequency and angle data). Thus, a final p-table may include the extracted principal component data sorted by frequency and angle. One embodiment of a p-table is provided in Table 4 below:

TABLE 4

$$\overline{p}(f, \theta, \varphi) = \begin{bmatrix} \Delta\Phi_{21}(f, \theta, \varphi) \\ \Delta\Phi_{31}(f, \theta, \varphi) \\ \vdots \\ \Delta\Phi_{M1}(f, \theta, \varphi) \end{bmatrix}$$

Where $\Delta\Phi_{xy}(f, \theta, \varphi)$ represents the vector data for an SCM element comparing array element x to array element y. For example, $\Delta\Phi_{xy}$ represents a principal component angle value for SCM element comparing an X array element and a Y array element, f represents frequency, θ represents a first angle value (e.g., azimuth angle) and φ represents a second angle value (e.g., elevation angle). M represents the number of entries in the p-table, which as indicated above, may correspond to the number of extracted principal components and the extracted entries from the vector data table. The p-table may include all of the vector data for each of the extracted principal components.

In some embodiments, the number and/or size (i.e., number of entries in the p-table) of p-tables generated may vary according to a particular application of the MINDIST method. For example, in some embodiments, the p-table may be generated for a desired angular field of view (e.g., ±M° az, ±N° el). Thus, the number of entries in the p-table can vary according to the desired angular field of view. Further, the number of entries in the p-table may correspond to the number of array elements in an antenna array and/or the number of principal components extracted from an SCM. For example, in some embodiments, for a K array element array, $$K' = \frac{(K^2 - K)}{2}$$

values or entries may be extracted from an SCM, where K' represents the number of principal components to be used (e.g., principal components to be extracted) for a particular application of the MINDIST technique.

In some embodiments, a p-table may be broken up into N different (θ, φ) subspaces. Each of the subspaces may be processed independent of each other or two or more of the N different (θ, φ) subspaces may be processed together. In an embodiment, each of the N different (θ, φ) subspaces may be processed on different systems (e.g., N different processors), and may be processed in simultaneously or substantially simultaneously. Thus, the computation time may be reduced by 1/N. The results from each system, each of the N different processors, may be compared to identify a minimum distance point.

In some embodiments, the one or more tables (e.g., non-zero SCM element table, vector data table) may be computed prior to one or more array elements receiving a signal and/or a sample of data being taken of a signal received at one or more array elements. For example, the tables may be pre-computed using previously collected data for an array and/or estimated data for an array (e.g., estimated snapshots at one or more array elements). In other embodiments, tables (e.g., non-zero SCM element table, vector data table) may be generated simultaneously to one or more array elements receiving a signal and/or a sample of data being taken of a signal received at one or more array elements.

At block 316, a distance may be determined between a test point and each value in the principal component table. In an embodiment, the distance measurement may be determined by the DF module 108 of FIG. 1 or the DF module 200 of FIG. 2. For example, in one embodiment, the distance measurement may be determined by the distance measurement module 214 of DF module 200.

The test point may refer to a sample of data (e.g., data snapshot) taken during an operation of a system (e.g., radar system, antenna system). For example, the test point can be selected from the real-time data collected from the snapshots at array 102 of FIG. 1 and/or one or more of the plurality of array elements 202a-202n of FIG. 2. In some embodiments, multiple test points may be used. The data from the test point may be measured against the values in the p-table to identify a minimum distance point (or a closest entry in the p-table to the test point collected). In some embodiments, multiple test points may be used. For example, in one embodiment, a distance may be calculated between each test point and each entry in the p-table. In an embodiment, a test point may be arbitrarily chosen from a plurality of snapshots (e.g., real time data points) collected during operation. In other embodiments, the test point may be predetermined.

In an embodiment, for each of the entries (values) in the p-tables, a distance may be calculated from the respective entry to the test point. In some embodiments, a distance metric may be selected to perform the calculation. For example, and without limitation, a Mahalanbois distance (equation 3 below) or a Euclidean distance (equation 4 below) to perform the calculation.

$$D_{mahal} = \sqrt{(\bar{x}-\bar{p})^T S^{-1}(\bar{x}-\bar{p})} \qquad \text{Eq. 3}$$

$$D_{seuc} = \sqrt{(\bar{x}-\bar{p})^T \left[\begin{pmatrix} \frac{1}{\sigma_1^2} & \cdots & 0 \\ \vdots & \ddots & \vdots \\ 0 & \cdots & \frac{1}{\sigma_N^2} \end{pmatrix}\right](\bar{x}-\bar{p})} \qquad \text{Eq. 4}$$

where $\bar{x}$ represents the Xth p-table entry data and $\bar{p}$ represents the test point data. In an embodiment in which the Euclidean distance is used, an inverse covariance matrix may be formed from the distribution of data points in the p-table for each principal component. The inverse covariance matrix can be applied in the distance measurement to compute the Euclidean distance between the test point and each of the p-table entries. In an embodiment, the inverse covariance matrix may be precomputed and applied to the p-table entries in order to reduce a computation time of the MINDIST technique.

At block 318, a minimum distance point corresponding to a direction of the received signal may be identified. In an embodiment, the minimum distance point may be determined by the DF module 108 of FIG. 1 or the DF module 200 of FIG. 2. For example, in one embodiment, the minimum distance point may be determined by the minimum distance module 216 of DF module 200.

In an embodiment, each of the measured distances for each of the entries in the p-table may be compared to identify a minimum distance point. For example, in one embodiment, equation 5, as provided below, may be used to solve for the minimum distance point.

$$(\hat{\theta},\hat{\varphi})=\arg_{(\theta,\varphi)}\min D(\theta,\varphi) \qquad \text{Eq. 5}$$

A point having the minimum distance to the test point, as compared with the other entries in the p-table may be identified. The value may be a minimum distance point representative of an angle of arrival of a signal on the one or more array elements.

In some embodiments, an estimation of the expected minimum point for a specific frequency may be generated. For example, in some embodiments, an expected minimum point may be estimated using previously collected data and/or estimations of array properties. Each of the entries in the p-table may be compared to the estimation to identify the entry in the p-table that is closest the estimation for the frequency.

In an embodiment, an output signal may be generated indicating the minimum distance point, such as a DF output signal. In an embodiment, the output signal may be generated by the DF module 108 of FIG. 1 or the DF module 200 of FIG. 2. The DF output signal may be an estimated angle of arrival of a signal incident one or more of the array elements. In some embodiments, the estimated angle of arrival of the signal may be a two-dimensional (2D) estimation.

Figure 4:
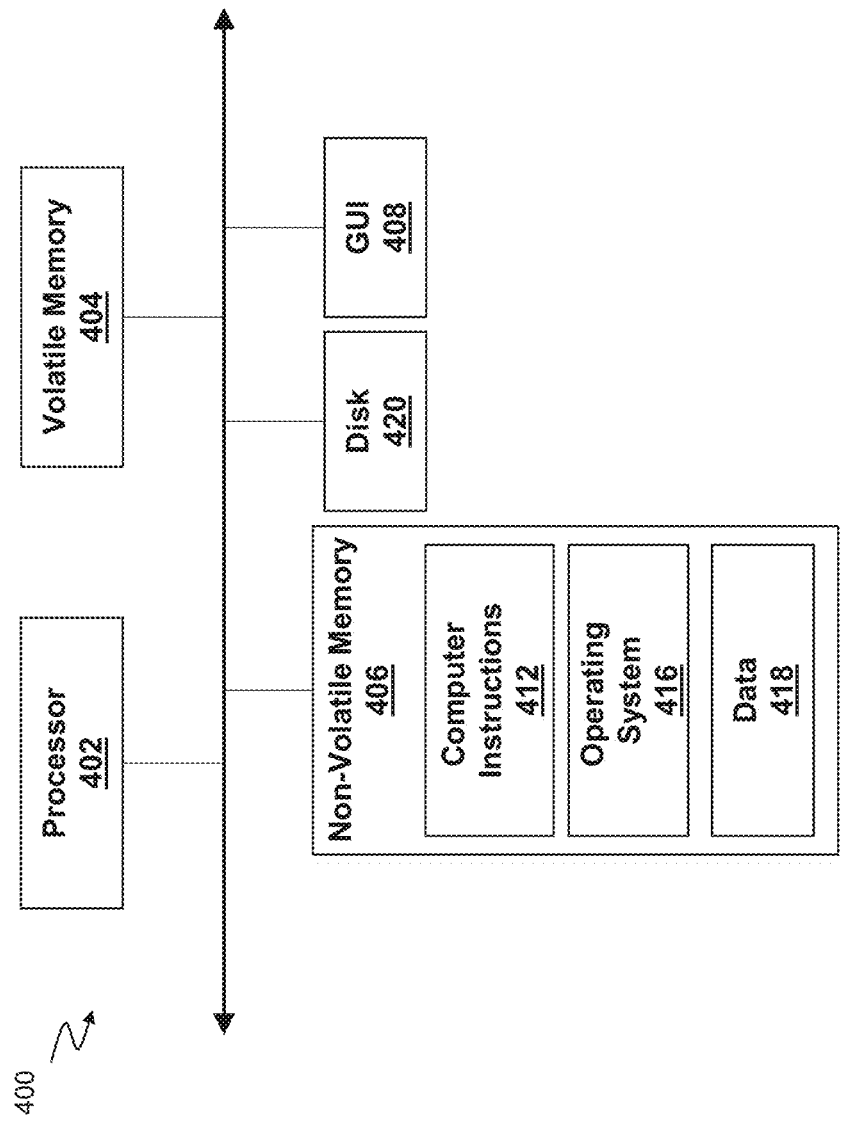
FIG. 4 is a block diagram of an embodiment of a computer system for performing the MINDIST method.

Referring now to FIG. 4, a computer 400 includes a processor 402, a volatile memory 404, a non-volatile memory 406 (e.g., hard disk), a graphical user interface (GUI) 408 (e.g., a mouse, a keyboard, a display, for example) and a computer disk 420. The non-volatile memory 406 stores computer instructions 412, an operating system 416 and data 418. In an embodiment, the data 418 may include samples taken of signals received at one or more array elements. The data may include complex I/Q data representing the signal. For example, in some embodiments, the samples may include complex voltage signals representative of angle, amplitude, phase, and/or a polarization of the signal. In embodiment, the samples may include an angle measurement of the signal relative to the phase center of the respective array element that received the signal. In an embodiment, each of the samples may be a snapshot of the signal at a predetermined period of time or over a predetermined time period.

In some embodiments, non-volatile memory 406 includes a look-up table that stores and organizes data corresponding to the samples taken, as well as any tables (e.g., p-tables, non-zero SCM element tables, SCM phase different matrices, vector data tables) or matrices generated using the samples of data. In one example, the computer instructions 412 are executed by the processor 402 out of volatile memory 404 to perform all or part of the method (or process) 300 of FIGS. 3A and 3B.

In an embodiment, computer 400 may be the same as or substantially similar to each of the components of the DF module 108 and/or DF module 200. For example, the spatial SCM module 210, principal components module 212, distance measurement module 214, minimum distance module 216 and p-table module 218. Computer 400 may perform all of the same functions and be configured to receive and generate the same data as each of the components of the DF module 108 and/or DF module 200 as described herein. For example, the spatial sample covariance matrix (SCM) module 210, principal components module 212, distance measurement module 214, minimum distance module 216 and p-table module 218. For example, computer 400 may be configured to perform real time direction finding determinations, capture samples of data corresponding to signals incident on or one or more array elements and generate tables and/or matrices (e.g., p-tables, non-zero SCM element tables, SCM phase different matrices, vector data tables) to identify a direction of arrival of a signal.

Method 300 is not limited to use with the hardware and software of FIG. 4; they may find applicability in any computing or processing environment and with any type of machine or set of machines that is capable of running a computer program. Method 300 may be implemented in hardware, software, or a combination of the two. Method 300 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform method 300 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. Alternatively, the system may be implemented, at least in part, as firmware.

A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform method 300. Method 300 may also be implemented as a machine-readable storage medium, configured with a computer program, where upon execution, instructions in the computer program cause the computer to operate in accordance with method 300.

Method 300 may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

A number of embodiments of the disclosure have been described. Nevertheless, it will be understood that various modifications may be made without departing from the spirit and scope of the disclosure. Elements of different embodiments described herein may be combined to form other embodiments not specifically set forth above. Other embodiments not specifically described herein are also within the scope of the following claims.

What is claimed is:

1. A method for direction finding comprising:
receiving signals at one or more array elements;
capturing samples of data corresponding to the received signals from an output of each of the one or more array elements,
generating a spatial sample covariance matrix (SCM) using the one or more samples of data;
extracting principal components from the SCM;
generating a principal component table using angle and frequency measurement for each of the principal components;
selecting a test point and determining a distance between the test point and each value in the principal component table; and
identifying a minimum distance point based on the determined distances between the test point and each value in the principal component table, wherein the minimum distance point corresponds to a direction of the received signals.

2. The method of claim 1, further comprising determining a phase center of each of the one or more array elements.

3. The method of claim 1, wherein each sample corresponds to a snapshot of a received signal over a predetermined period of time.

4. The method of claim 1, further comprising determining frequency, amplitude and phase properties of the received data from the one or more array elements.

5. The method of claim 1, wherein each of the samples of data includes an angle measurement corresponding to the received data relative to a phase center of one of the one or more array elements.

6. The method of claim 5, wherein the SCM includes the angle measurement for each of the one or more array elements.

7. The method of claim 6, further comprising identifying a phase difference between each of the elements in the SCM using the angle measurement.

8. The method of claim 1, further comprising identifying phase difference measurements from the SCM that are greater than zero or less than zero.

9. The method of claim 8, further comprising extracting the phase difference measurements from the SCM that are greater than zero or less than zero.

10. The method of claim 1, further comprising determining vector data for each of the one or more array elements, wherein the vector data includes an angle and a frequency measurement.

11. The method of claim 10, further comprising determining a product of the vector data from each of the one or more elements and a complex conjugate for the vector data from each of the one or more elements.

12. The method of claim 1, wherein the principal component table includes principal component data sorted by frequency measurements and angle measurements for each of the principal components.

13. The method of claim 3, further comprising determining the test point based on the snapshot of the received signal over the predetermined period of time.

14. The method of claim 1, wherein determining the distance further comprises using a Mahalanbois distance method or a Euclidean distance method.

15. The method of claim 1, wherein determining a distance further comprises applying an inverse covariance matrix to each entry in the principal component table.

* * * * *